United States Patent
Lau et al.

(10) Patent No.: US 8,421,380 B2
(45) Date of Patent: Apr. 16, 2013

(54) ELECTRIC MOTOR

(75) Inventors: James Ching Sik Lau, Hong Kong (CN); Chang Lin Jin, Shenzhen (CN)

(73) Assignee: Johnson Electric S.A., Murten (CH)

( * ) Notice: Subject to any disclaimer, the term of this patent is extended or adjusted under 35 U.S.C. 154(b) by 409 days.

(21) Appl. No.: 12/839,140

(22) Filed: Jul. 19, 2010

(65) Prior Publication Data

US 2011/0012549 A1    Jan. 20, 2011

(30) Foreign Application Priority Data

Jul. 17, 2009  (CN) .......................... 2009 1 0108907

(51) Int. Cl.
*H02P 1/00*    (2006.01)
(52) U.S. Cl.
USPC .......................................... 318/139; 310/248
(58) Field of Classification Search .................. 318/139, 318/772; 310/248, 262, 140
See application file for complete search history.

(56) References Cited

U.S. PATENT DOCUMENTS

| | | | |
|---|---|---|---|
| 3,504,328 A * | 3/1970 | Olsson ............................. | 439/79 |
| 4,910,790 A * | 3/1990 | Kershaw ........................ | 388/836 |
| 5,485,049 A * | 1/1996 | Shannon et al. .............. | 310/248 |
| 5,734,219 A * | 3/1998 | Horski et al. ................. | 310/240 |
| 5,925,999 A * | 7/1999 | Lakerdas et al. ............. | 318/496 |
| 6,694,599 B1 * | 2/2004 | Kershaw et al. ................ | 29/597 |
| 7,161,272 B2 | 1/2007 | Enyedy et al. | |
| 7,454,127 B2 * | 11/2008 | Simofi-Ilyes et al. ........ | 388/806 |
| 7,893,586 B2 * | 2/2011 | West et al. .................... | 310/140 |
| 2009/0033159 A1 | 2/2009 | West et al. | |
| 2009/0256502 A1 * | 10/2009 | Naumann et al. ............. | 318/139 |

FOREIGN PATENT DOCUMENTS

| JP | 2002119031 | 4/2002 |
|---|---|---|
| JP | 2007137162 | 6/2007 |
| JP | 2007143278 | 6/2007 |

* cited by examiner

*Primary Examiner* — Rina Duda
(74) *Attorney, Agent, or Firm* — Muncy, Geissler, Olds & Lowe, PLLC

(57) ABSTRACT

A direct current motor includes a stator and a rotor. The rotor has a shaft; a rotor core fixed to the shaft; a commutator fixed to the shaft; and rotor windings wound about poles of the rotor core and terminated on the commutator. The motor also has a common brush and at least two selectable brushes in sliding contact with the commutator; at least two direct current power sources; and a switching device configured to connect the common brush and a selected one of the selectable brushes with predetermined combinations of the power sources to operate the motor in different speed modes.

8 Claims, 3 Drawing Sheets

ELECTRIC MOTOR

CROSS REFERENCE TO RELATED APPLICATIONS

This non-provisional patent application claims priority under 35 U.S.C. §119(a) from Patent Application No. 200910108907.9 filed in The People's Republic of China on Jul. 17, 2009.

FIELD OF THE INVENTION

The invention relates to a motor, and in particular, to a direct current motor.

This invention relates to a motor assembly and in particular, to an assemble having a multiple speed DC motor.

BACKGROUND OF THE INVENTION

Appliances driven by electric motors are often required to operate at different rotational speeds. For example, when a drill driven by a motor is used for drilling holes, high speed operation is required, and when it is used for turning screws, low speed operation is required. Even though the motor may drive the appliance through a gearbox, sometimes the speed reduction provided by the gearbox is not sufficient or the use of a gearbox is not appropriate.

Speed and torque and battery voltage and current

SUMMARY OF THE INVENTION

Hence there is a desire for a motor which can operate in different predetermined speed modes.

Accordingly, in one aspect thereof, the present invention provides a direct current motor comprising a stator and a rotor, the rotor comprising: a shaft; a rotor core fixed to the shaft; a commutator fixed to the shaft; rotor windings wound about poles of the rotor core and terminated on the commutator; a common brush and at least two selectable brushes in sliding contact with the commutator; at least two direct current power sources; and a switching device configured to connect the common brush and a selected one of the selectable brushes with predetermined combinations of the power sources to operate the motor in different speed modes.

Preferably, the at least two selectable brushes comprises a low speed brush corresponding to low speed operation of the motor and a high speed brush corresponding to high speed operation of the motor; and wherein the switching device connects the power sources in series between the common brush and the high speed brush, to operate the motor in a high speed mode; and wherein the switching device connects the power sources in parallel between the common brush and the low speed brush, to operate the motor in a low speed mode.

Preferably, the at least two direct current power sources comprises a first power source and a second power source, and the switching device comprises three single pole double throw switches and each switch comprises two contact points and one contact arm; the first switch has one contact point connected with the positive terminal of the first power source and the fixed end of the contact arm connected with the positive terminal of the second power source; the second switch has one contact point connected with the positive terminal of the first power source, the other contact point connected with the negative terminal of the first power source and the common brush, and the fixed end of the contact arm connected with the negative terminal of the second power source; the third switch has one contact point connected to the low speed brush, the other contact point connected to the high speed brush, and the fixed end of the contact arm connected with the positive terminal of the second power source.

Preferably, the contact arms of the three switches are connected together via a connecting rod.

Preferably, the voltages of the power sources are equal.

Alternatively, the motor comprises two selectable brushes corresponding to low speed and high speed respectively; when the switching device connects the power sources in series between the common brush and the high speed brush, the motor operates in a high speed mode; and when the switching device connects one of the power sources between the common brush and the low speed brush the motor operates in a low speed mode.

Alternatively, the motor comprises two selectable brushes corresponding to low speed and high speed respectively; the power sources comprises a power source with a higher voltage and a power source with a lower voltage; and the switching device selectively connects the power source with the higher voltage between the common brush and the high speed brush, or connects the power source with the lower voltage between the common brush and the low speed brush.

Preferably, the switching device is a linked switch connected between the power sources and the selectable brushes.

Alternatively, the motor comprises two selectable brushes corresponding to low speed and high speed respectively; voltages of the power sources are different; and the switching device selectively connects anyone of the power sources between the common brush and anyone of the selectable brushes.

Alternatively, the at least two selectable brushes comprises a low speed brush and a high speed brush, and wherein the at least one power source comprises a first power source connected between the common brush and the switching device and a second power source connected between the switching device and the high speed brush, the switching device selectably connecting the first power source to the low speed brush for operating the motor in a low speed mode or connecting the first power source in series with the second power source between the common brush and the high speed brush to operate the motor in a high speed mode.

Advantages of embodiments of the present invention include that different brushes and corresponding combinations of the power sources can be selected by the switching device so that the motor operates in different speed modes. Optionally, effective work time of the motor can be increased by connecting the power sources in parallel when the motor is required to rotate at low speed or with greater torque.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
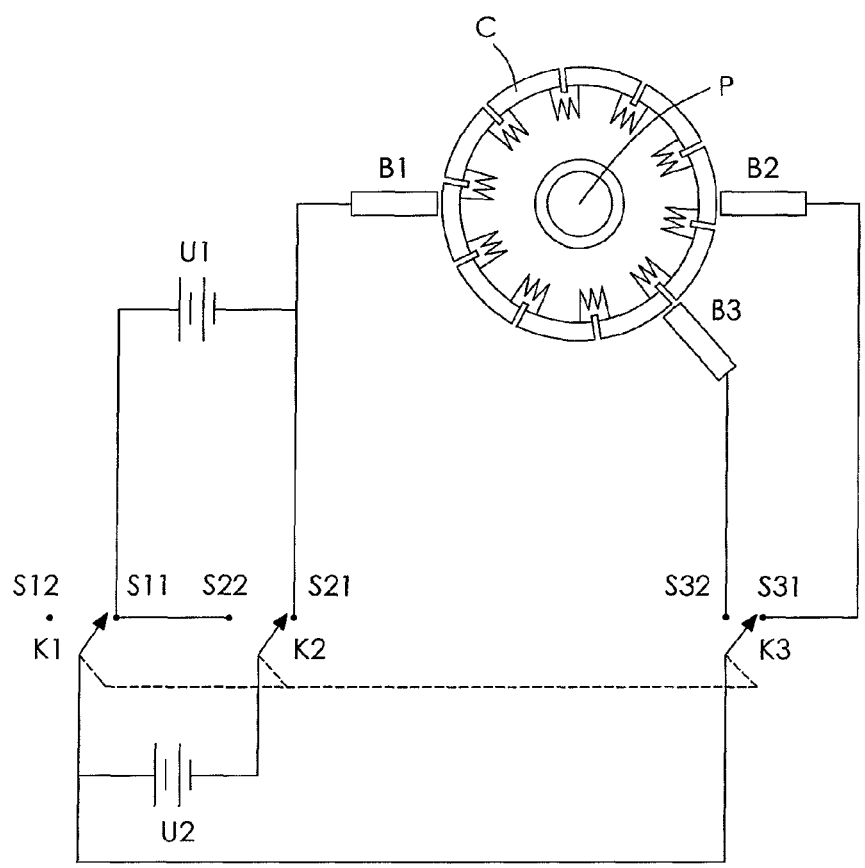
FIG. 1 shows a schematic connection arrangement of the commutator, brushes, power sources and switching device of a motor in accordance with a first embodiment of the present invention.

FIG. 1 schematically illustrates a direct current (DC) motor comprising a commutator C, a common brush B1, a low speed brush B2, a high speed brush B3, two DC power sources U1, U2, and a switching device. The brushes B1, B2, B3 are in sliding contact with the commutator C. The commutator C is attached to the motor shaft P and comprises a plurality of spaced-apart segments. Windings wound about a core of the rotor are connected to the segments. In this embodiment, voltages of the DC power sources U1, U2 are equal.

The switching device comprises three single pole double throw switches K1, K2, and K3. Each switch comprises two contact points and one contact arm with a fixed end and a free end arranged for selectively connecting with one of the two contact points. For the first switch K1, the first contact point S11 is connected with the positive terminal of the first power source U1, the second contact point S12 is left unconnected, and the fixed end of its contact arm is connected with the positive terminal of the second power source U2. For the second switch K2, the first contact point S21 is connected to a point between the negative terminal of the first power source U1 and the common brush B1, the second contact point S22 is connected to the positive terminal of the first power source U1, and the fixed end of its contact arm is connected to the negative terminal of the second power source U2. For the third switch K3 the first contact point S31 is connected to the low speed brush B2, the second contact point S32 is connected to the high speed brush B3, and the fixed end of the contact arm is connected with the positive terminal of the second power source U2. Contact arms of the three switches K1, K2, K3 are connected together via a connecting rod (shown by a broken line in FIG. 1). That is, selecting states of the free ends of the contact arms of the three switches can be changed by pushing the connecting rod.

When the free ends of the contact arms of the three switches K1, K2, K3 are connected with the first contact points S11, S21, S31 by pushing the connecting rod, the power sources U1, U2 will be connected in parallel, between the common brush B1 and the low speed brush B2 and the motor shaft P will rotate at low speed, i.e. the motor will operate in a low speed mode. When the free ends of the contact arms of the three switches K1, K2, K3 are connected with the second contact points S12, S22, S32 by pushing the connecting rod, the power sources U1, U2 will be connected in series between the common brush B1 and the high speed brush B3, and the motor shaft P will rotate at high speed, i.e., the motor will operate in a high speed mode.

In the above embodiment, different brushes and corresponding combinations of the power sources can be selected by the switching device so that the motor can rotate in different speed modes. Furthermore, effective work time of the motor can be increased by using the power sources U1, U2 connected in parallel when the motor is required to rotate at low speed. As an alternative arrangement, the three switches could be replaced by a single three pole double throw switch.

Figure 2:
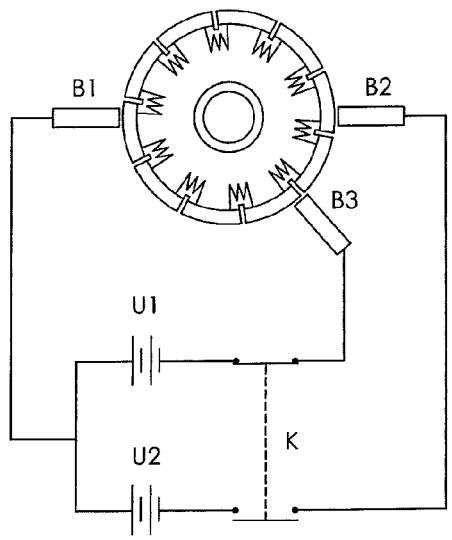
FIG. 2 shows a schematic connection arrangement, similar to FIG. 1, of a motor in accordance with a second embodiment of the present invention.

A second embodiment is shown in FIG. 2, in which the switching device is a linked switch K, such as a double pole, single throw switch, as shown, or a double pole, double throw switch. The common brush B1 is connected to the positive terminals of the power sources U1, U2, and the negative terminals of the power sources U1, U2 are respectively connected with the high speed brush B3 and the low speed brush B2 via contacts of the linked switch K. The linked switch K selectively connects the power source U1 with the high speed brush B3, or connects the power source U2 with the low speed brush B2. In this embodiment, the voltage of the power source U1 is preferably higher than the voltage of the power source U2.

Figure 3:
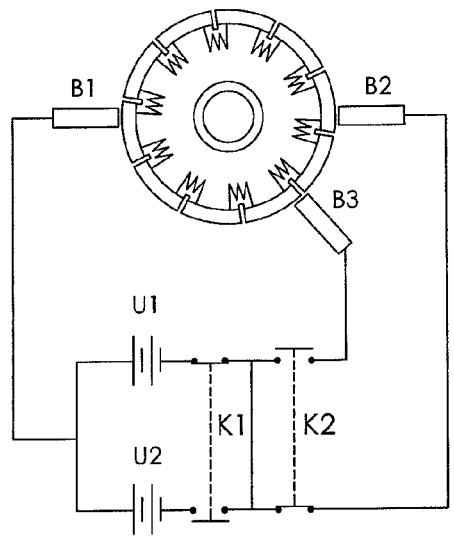
FIG. 3 shows a schematic connection arrangement, similar to FIG. 1, of a motor in accordance with a third embodiment of the present invention.

It should be understood that the switching device can also be a pair of linked switches K1, K2, as shown in FIG. 3. The voltages of the two power sources are not equal. Selectively connecting one of the power sources U1, U2 with one of the brushes B1, B2, B3, such as connecting U1 with B2, U2 with B2, U1 with B3, or U2 with B3 can be obtained through the cooperation of the pair of linked switches K1, K2, thereby the motor can be operated at more different speeds. In addition, when one of the power sources is run out, the other one can be switched on conveniently.

Figure 4:
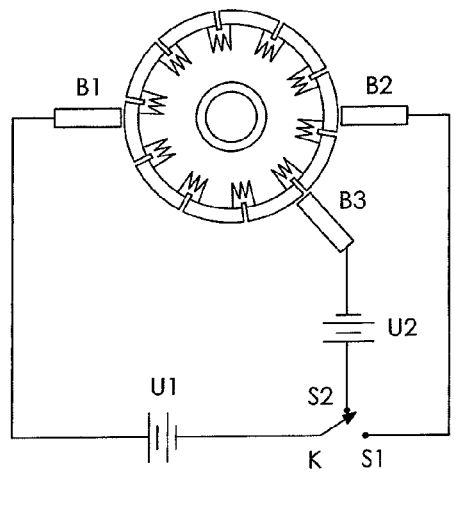
FIG. 4 shows a schematic connection arrangement, similar to FIG. 1, of a motor in accordance with a fourth embodiment of the present invention.

Referring to FIG. 4, it should be understood that switching device can also be a single pole double throw switch K. Contact point S1 of the switch K is connected to the low speed brush B2 and contact point S2 is connected to the positive terminal of the power source U2, and the fixed end of the contact arm of the switch K is connected with the negative terminal of the power source U1. When the free end of the contact arm of the switch K is connected to the contact point S1, the power source U1 will be connected with the low speed brush B2 and the motor will rotate in the low speed mode. When the free end of the contact arm of the switch K is connected to the contact point S2, the power source U1 will be connected with the power source U2 in series between the common brush B1 and the high speed brush B3, and the motor shaft will rotate at high speed.

Figure 5:
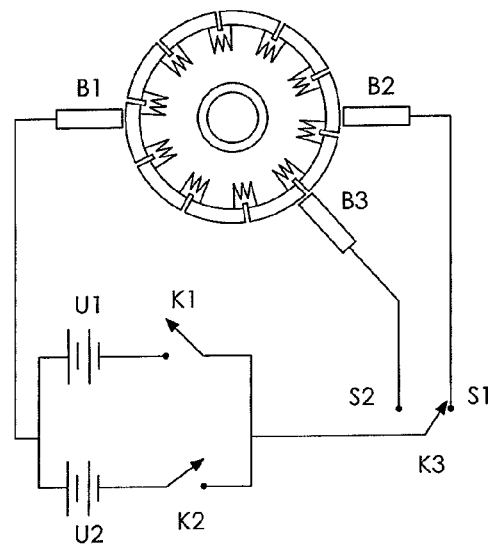
FIG. 5 shows a schematic connection arrangement, similar to FIG. 1, of a motor in accordance with a fifth embodiment of the present invention.

Referring to FIG. 5, it should be understood that the switching device can also be a pair of single pole single throw switches K1, K2 and a single pole double throw switch K3. The switches K1, K2 are connected between the negative terminals of the power sources U1, U2 and the fixed end of the contact arm of the switch K3 respectively. The contact point S1 of the switch K3 is connected to the low speed brush B2 and the contact point S2 of the switch K3 is connected to the high speed brush B3, The positive terminals of the power sources U1, U2 are connected with the common brush B1. Selectively connecting one of power sources U1, U2 with one of the brushes B2, B3, such as connecting U1 with B2, U1 with B3, U2 with B2, or U2 with B3 can be obtained through the operation of the switches K1, K2, K3. In addition, both power sources can be connected in parallel to either selectable brush for additional power in that speed mode. This is particularly desirable for the low speed mode when additional torque is required.

Figure 6:
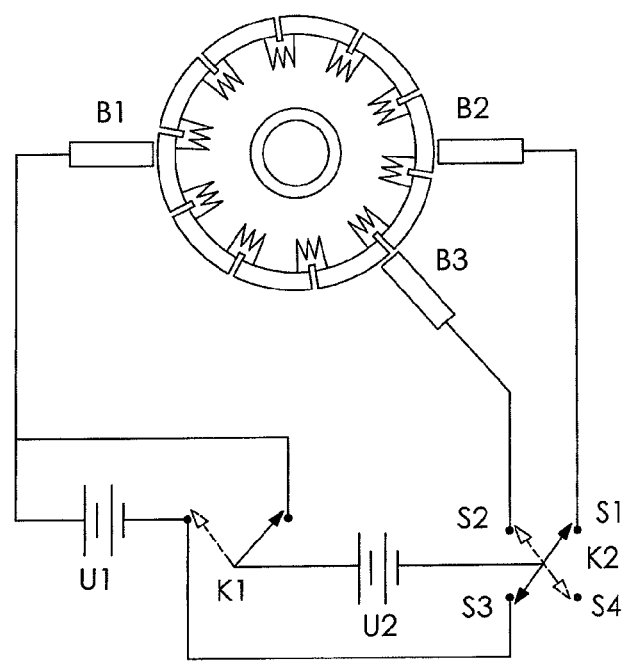
FIG. 6 shows a schematic connection arrangement, similar to FIG. 1, of a motor in accordance with a sixth embodiment of the present invention.

As shown in FIG. 6, the switching device can also be a single pole double throw switch K1 and a linked switch K2. The fixed end of the contact arm of the switch K1 is connected with the positive terminal of the power source U2, two contact points of the switch K1 are respectively connected with two terminals of the power source U1, the common brush B1 is connected with the positive terminal of the power source U1. The linked switch K2 comprises four contact points S1~S4 and a contact arm with a central terminal and two free ends for selectively connecting with two of the contact points S1~S4. The contact point S1 is connected with the low speed brush B2, the contact point S2 is connected with the high speed brush B3 and the contact point S3 is connected with the negative terminal of the power source U1. The center terminal is connected with the negative terminal of the power source U2. Through operation of the switches K1, K2, selective connection of the power sources U1, U2 with the high speed brush B3 or connection of the power source U2 with the low speed brush B2 can be obtained to operate the motor in different predetermined speed modes. That is, low speed brush B2 can be connected to both power sources connected in parallel, while the high speed brush B3 can be connected to both power sources connected in series or to just power source U2 to provide two high speed modes of operation. If switch K1 has an open position then brush B2 could be connected to just power source U2 allowing the two power sources to have different voltages and thus not suitable to being connected in parallel.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, number of power sources can optionally be three or four or more and the number of brushes can optionally be four or more. By selecting different brushes and corresponding combinations of the power sources, the motor can operate in different speed modes.

The invention claimed is:

1. A direct current motor comprising a stator and a rotor, the rotor comprising:
a shaft;
a rotor core fixed to the shaft;
a commutator fixed to the shaft;
rotor windings wound about poles of the rotor core and terminated on the commutator;
a common brush and at least two selectable brushes in sliding contact with the commutator;
at least two direct current power sources; and
a switching device configured to connect the common brush and a selected one of the selectable brushes with predetermined combinations of the power sources to operate the motor in different speed modes;
wherein the at least two selectable brushes comprises a low speed brush corresponding to low speed operation of the motor and a high speed brush corresponding to high speed operation of the motor;
the switching device connects the power sources in series between the common brush and the high speed brush, to operate the motor in a high speed mode;
the switching device connects the power sources in parallel between the common brush and the low speed brush, to operate the motor in a low speed mode;
the at least two direct current power sources comprises a first power source and a second power source, and the switching device comprises three single pole double throw switches and each switch comprises two contact points and one contact arm;
the first switch has one contact point connected with the positive terminal of the first power source and the fixed end of the contact arm connected with the positive terminal of the second power source;
the second switch has one contact point connected with the positive terminal of the first power source, the other contact point connected with the negative terminal of the first power source and the common brush, and the fixed end of the contact arm connected with the negative terminal of the second power source; and
the third switch has one contact point connected to the low speed brush, the other contact point connected to the high speed brush, and the fixed end of the contact arm connected with the positive terminal of the second power source.

2. The motor of claim 1, wherein the contact arms of the three switches are connected together via a connecting rod.

3. The motor of claim 1, wherein the voltages of the power sources are equal.

4. A direct current motor comprising a stator and a rotor, the rotor comprising:
a shaft;
a rotor core fixed to the shaft;
a commutator fixed to the shaft;
rotor windings wound about poles of the rotor core and terminated on the commutator;
a common brush and at least two selectable brushes in sliding contact with the commutator;
at least two direct current power sources; and
a switching device configured to connect the common brush and a selected one of the selectable brushes with predetermined combinations of the power sources to operate the motor in different speed modes;
wherein the at least two selectable brushes comprise a low speed brush and a high speed brush corresponding to low speed and high speed respectively;
when the switching device connects the power sources in series between the common brush and the high speed brush, the motor operates in a high speed mode; and
when the switching device connects one of the power sources between the common brush and the low speed brush the motor operates in a low speed mode.

5. A direct current motor comprising a stator and a rotor, the rotor comprising:
a shaft;
a rotor core fixed to the shaft;
a commutator fixed to the shaft;
rotor windings wound about poles of the rotor core and terminated on the commutator;
a common brush and at least two selectable brushes in sliding contact with the commutator;
at least two direct current power sources; and
a switching device configured to connect the common brush and a selected one of the selectable brushes with predetermined combinations of the power sources to operate the motor in different speed modes;
wherein the at least two selectable brushes comprise a low speed brush and a high speed brush corresponding to low speed and high speed respectively;
the power sources comprises a power source with a higher voltage and a power source with a lower voltage; and
the switching device selectively connects the power source with the higher voltage between the common brush and the high speed brush, or connects the power source with the lower voltage between the common brush and the low speed brush.

6. The motor of claim 5, wherein the switching device is a linked switch connected between the power sources and the selectable brushes.

7. A direct current motor comprising a stator and a rotor, the rotor comprising:
- a shaft;
- a rotor core fixed to the shaft;
- a commutator fixed to the shaft;
- rotor windings wound about poles of the rotor core and terminated on the commutator;
- a common brush and at least two selectable brushes in sliding contact with the commutator;
- at least two direct current power sources; and
- a switching device configured to connect the common brush and a selected one of the selectable brushes with predetermined combinations of the power sources to operate the motor in different speed modes;
- wherein the motor comprises two selectable brushes corresponding to low speed and high speed respectively;
- voltages of the power sources are different; and
- the switching device selectively connects anyone of the power sources between the common brush and anyone of the selectable brushes.

8. A direct current motor comprising a stator and a rotor, the rotor comprising:
- a shaft;
- a rotor core fixed to the shaft;
- a commutator fixed to the shaft;
- rotor windings wound about poles of the rotor core and terminated on the commutator;
- a common brush and at least two selectable brushes in sliding contact with the commutator;
- at least two direct current power sources; and
- a switching device configured to connect the common brush and a selected one of the selectable brushes with predetermined combinations of the power sources to operate the motor in different speed modes;
- wherein the at least two selectable brushes comprises a low speed brush and a high speed brush, and wherein the at least two power source comprises a first power source connected between the common brush and the switching device and a second power source connected between the switching device and the high speed brush, the switching device selectably connecting the first power source to the low speed brush for operating the motor in a low speed mode or connecting the first power source in series with the second power source between the common brush and the high speed brush to operate the motor in a high speed mode.

* * * * *